(12) United States Patent
Price et al.

(10) Patent No.: US 8,464,066 B1
(45) Date of Patent: Jun. 11, 2013

(54) METHOD AND SYSTEM FOR SHARING SEGMENTS OF MULTIMEDIA DATA

(75) Inventors: Roy F. Price, Seattle, WA (US); Ameesh Paleja, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 1730 days.

(21) Appl. No.: 11/480,777

(22) Filed: Jun. 30, 2006

(51) Int. Cl.
*H04L 9/32* (2006.01)

(52) U.S. Cl.
USPC ............ 713/180; 726/2; 726/4; 726/5; 726/6; 726/7; 709/217

(58) Field of Classification Search
USPC .................. 713/1, 2, 188, 194, 180; 380/200, 380/201, 255, 277; 726/2, 4–7; 709/277
See application file for complete search history.

(56) References Cited

U.S. PATENT DOCUMENTS

| | | | |
|---|---|---|---|
| 6,993,580 B2 * | 1/2006 | Isherwood et al. | 709/225 |
| 7,284,271 B2 * | 10/2007 | Lucovsky et al. | 726/21 |
| 7,313,692 B2 * | 12/2007 | Weeks et al. | 713/156 |
| 7,433,876 B2 * | 10/2008 | Spivack et al. | 707/100 |
| 7,500,176 B2 * | 3/2009 | Thomson et al. | 715/202 |
| 2004/0246376 A1 * | 12/2004 | Sekiguchi et al. | 348/468 |
| 2004/0255243 A1 * | 12/2004 | Vincent, III | 715/513 |
| 2005/0052685 A1 * | 3/2005 | Herf et al. | 358/1.15 |
| 2005/0216550 A1 * | 9/2005 | Paseman et al. | 709/202 |
| 2006/0106783 A1 * | 5/2006 | Saffer et al. | 707/3 |
| 2006/0167860 A1 * | 7/2006 | Eliashberg et al. | 707/3 |
| 2006/0173972 A1 * | 8/2006 | Jung et al. | 709/217 |
| 2006/0212435 A1 * | 9/2006 | Williams et al. | 707/3 |
| 2007/0058596 A1 * | 3/2007 | Frid-Nielsen et al. | 370/338 |
| 2007/0101387 A1 * | 5/2007 | Hua et al. | 725/113 |
| 2010/0008252 A1 * | 1/2010 | Alve | 370/252 |

OTHER PUBLICATIONS

"A Technical Overview of Windows Media DRM 10 for Devices", Microsoft Corporation, Jun. 2004, pp. 1-22.
Cohen, "A General Overview of Two New Technologies for Playing Protected Content on Portable of Networked Devices", Microsoft Corporation, Jun. 2004, pp. 1-16.
Dimitrova, et al., "Applications of Video-Content Analysis and Retrieval", IEEE Multimedia, Jul.-Sep. 2002, pp. 42-55.
"DRM Architecture , Approved Version 2.0", Open Mobile Alliance Ltd., Mar. 3, 2006, pp. 1-24.
"Using Digital Rights Management to Protect Content", retrieved on Apr. 27, 2006 at <<http://msdn.microsoft.com/library/en-us/wmencode/htm/usingdigitalrightsmanagetoprotectcontent.asp?frame=>>, Microsoft Corporation, 2006, pp. 1-2.

* cited by examiner

*Primary Examiner* — April Y Blair
*Assistant Examiner* — Joseph Pan
(74) *Attorney, Agent, or Firm* — Lee & Hayes, PLLC

(57) ABSTRACT

A system and method for storing segments of multimedia data with other users. A user selects a segment of data from the multimedia data by activating a user interface control. Prior to sharing the data segment, however, permission to share a data segment from such multimedia is determined based on various types of metadata. In another embodiment, data segments may be shared in accordance with an affiliate program under which affiliate users may earn benefits for sharing data segments with others.

56 Claims, 9 Drawing Sheets

METHOD AND SYSTEM FOR SHARING SEGMENTS OF MULTIMEDIA DATA

FIELD OF THE INVENTION

The present invention generally relates to selecting a data segment from multimedia data, and more specifically relates to a method and system for selecting a data segment from multimedia data and sharing the data segment with selected destinations.

BACKGROUND OF THE INVENTION

Advances in data capture, storage, and communication technologies have made vast amounts of multimedia data available to private and commercial customers. In addition, advances in processing power and increases in communication bandwidth have made the sharing of multimedia data more practical and prevalent. There are a number of computer software applications, such as media player software applications, that provide consumers easy access to multimedia data such as videos and music. Other computer software applications such as electronic mail (e-mail), instant messaging, and data download software applications also facilitate communication and sharing of multimedia data. Because of the above-mentioned advances, sharing of multimedia data via communication networks has become prolific.

In addition to non-commercial multimedia data such as amateur and personal videos, commercial multimedia data such as movies and television series are increasingly available. Because much multimedia data, such as movies and television series, are subject to copyright and/or other protection, the sharing of such data may be governed by digital rights management ("DRM") policies. Even for the permissible sharing of multimedia data, a user often faces cumbersome procedures. For example, if a user wants to share a segment of a multimedia program, the user may have to save the multimedia program locally on his computer, launch another software application program to edit and store a desired segment of the multimedia program, use yet another program such as e-mail for communication, attach the stored data segment to an e-mail and send the data segment to a desired destination.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above-described shortcomings, a computer-implemented method and system are provided for sharing data segments of multimedia data. In accordance with the disclosed method and system, segments of multimedia data may be selected by a user and shared with users located at other destinations, if permission to do so is first obtained. In one embodiment, permission is obtained based on metadata associated with the data segment. The metadata may include DRM information, non-DRM information or a combination thereof. Once permission is obtained, either the selected data segment or a link to the data segment may be sent to one or more destinations selected by the user. Such a destination may include an electronic mail destination, a Web page destination, a Web log destination, RSS feed, etc. In other embodiments, the user may be a member of an affiliate program and thus, acquire benefits by sharing data segments with others.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
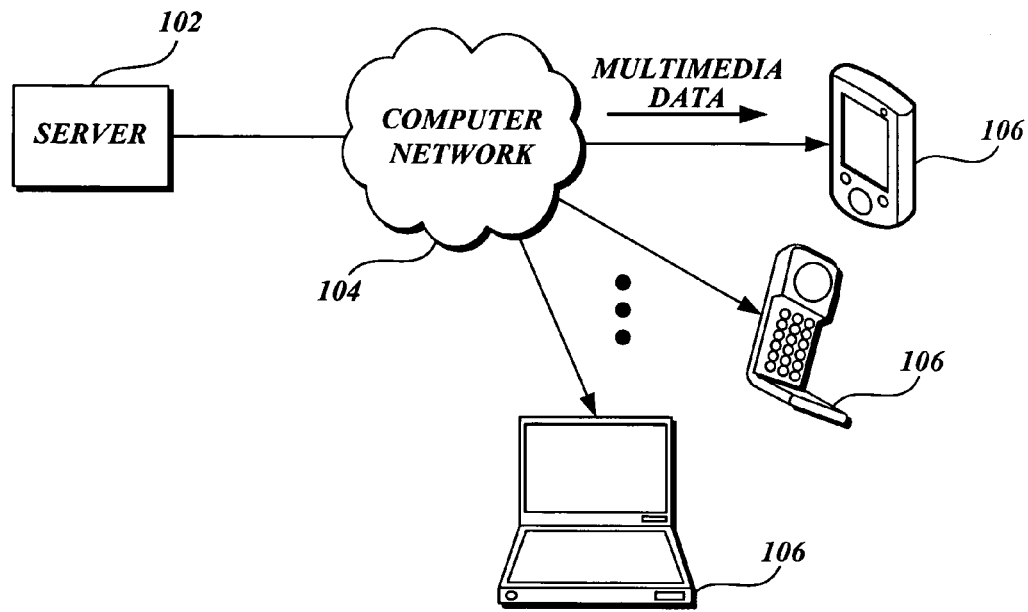
FIG. 1A is a pictorial diagram depicting a sample operating environment suitable for selecting and sharing data segments of multimedia data.

As will be described in more detail below, a user may share a segment of multimedia data with other users in accordance with various embodiments of the invention. For example, the user of a client computing device, such as a personal computer, may be presented with multimedia data, such as a television (TV) series episode. The user may decide to share a segment from the episode with others. In one embodiment, the user may select a segment of data from the presented multimedia data by activating a control provided by a user interface presented by the client device. The selected data segment may include, for example, a certain duration, e.g., 30 seconds, 60 seconds, etc., of multimedia data presented immediately prior to activating the user interface control. The user may then choose to share the data segment with others. For example, the data segment may be shared with others by sending an e-mail message including a link to a hypermedia page for presenting the data segment. As yet another example, the data segment may be shared with others by sending the data segment as a multimedia file so that it may be posted on, by, or at a network service or location such as a Web page or a Web log (BLOG). In such cases each selected data segment is assigned a unique ID for identification purposes. Similarly, each destination to which the selected data segments, or links to such selected data segments, are sent is also assigned a unique destination ID in order to ensure permitted delivery.

Some multimedia data, such as movies and TV series, are subject to copyright and/or other protection. Hence, permission to share a segment of such multimedia data is obtained before sharing the data segment. Accordingly, in some embodiments, permission to share is obtained based on DRM information for the multimedia data. In other embodiments, permission is obtained based on non-DRM information or a combination of DRM and non-DRM information.

Although the above description refers to a single data segment selected by a user, in other embodiments, multiple data segments may be selected and shared. In yet other embodiments, the user may be an affiliate user who accumulates benefits by sharing certain data segments with others. For example, the affiliate user may be given a certain number of credit points toward purchase of services or merchandise for each data segment he or she shares with others.

The following detailed description describes illustrative embodiments of the invention. Although specific operating environments, system configurations, user interfaces and flow diagrams may be illustrated and/or described, it should be understood that the examples provided are not exhaustive and do not limit the invention to the precise forms and embodiments disclosed. Persons skilled in the field of computer programming will recognize that components and process elements described herein may be interchangeable with other components or elements, or combinations of components or elements, and still achieve the benefits and advantages of the invention. Although the present description may refer to the Internet, persons skilled in the art will recognize that other network environments that include local area networks, wide area networks and/or wired or wireless networks may also be suitable. In addition, although the below description describes a client/server architecture, those skilled in the art will recognize that the invention may be implemented in a peer-to-peer network as well.

Prior to discussing the details of the invention, it will be appreciated by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well known process elements have not been described in detail in order not to unnecessarily obscure the invention.

FIG. 1A is a pictorial diagram depicting a sample operating environment for selecting and sharing data segments obtained from multimedia data. Multimedia data may include text, sound, graphics, animation, video, and any combination thereof. In addition, multimedia data may include hypertext, hypermedia, or any other content containing links or connections between such content. The illustrated operating environment includes one or more servers 102 communicatively coupled to a variety of client devices 106 via a computer network 104, such as the Internet. The client devices 106 are typically computing devices including a variety of configurations or forms, such as, but not limited to, personal computers, personal digital assistants (PDAs), mobile phones, hybrid PDA/mobile phones, workstations, interactive satellite radios, personal media players, set-top boxes, electronic readers, etc.

In operation, the server 102 provides multimedia data to the client devices 106 via the computer network 104. A user of a client device 106 may select one or more data segments from the multimedia data and share the selected data segment with others. For example, and as described in more detail below, the client device 106 may send a request to the server 102 to share the data segment with one or more destinations, e.g., a Web page, BLOG, etc. The server 102 determines permission for sharing the data segment with the selected destinations. If the server 102 verifies permission for sharing the data segment with the selected destinations, the server 102 sends the data segment, and/or a link to such data segment, to the selected destinations.

In one embodiment, the multimedia data provided by the server 102 is presented on the client device 106 using a Web browser. In another embodiment, the multimedia data is presented on the computing client device 106 in a software application such as a media player software application. The multimedia data may be streaming data such as a streaming video or music, or may be contained in a multimedia file which is downloaded to the client device 106 and stored thereon. In addition, the multimedia data may include broadcast multimedia data from broadcast centers such as television and radio stations. Those skilled in the art will appreciate that there are other sources of multimedia data which may be provided to the client device 106 by the server 102.

Figure 1B:
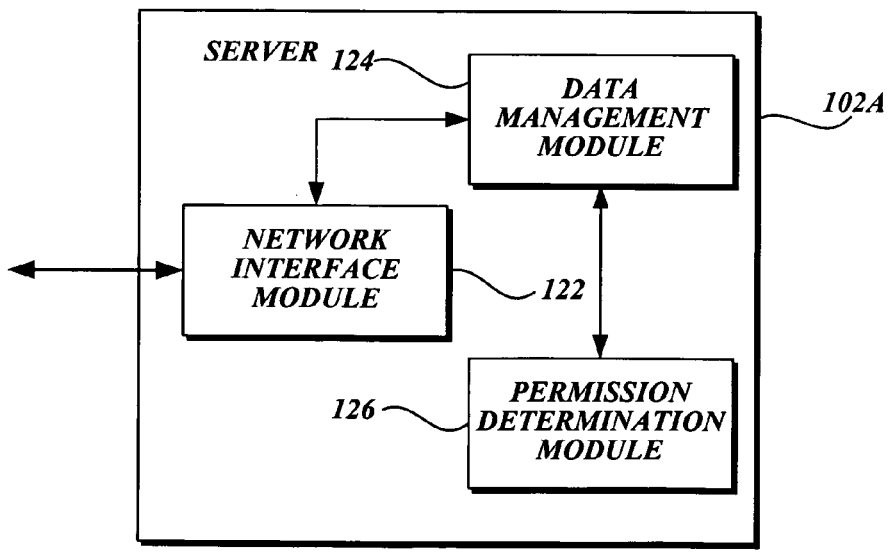
FIG. 1B is a block diagram depicting sample components of an illustrative multimedia server suitable for sharing data segments in the operating environment shown in FIG. 1A.

FIG. 1B is a block diagram depicting sample components of an illustrative server 102A suitable for sharing data segments. Server 102A includes a network interface module 122, a data management module 124, and a permission determination module 126. In one embodiment, the network interface module 122 is a hardware component. However, in other embodiments, the network interface module 122 is a software component or a combination of hardware and software components. The network interface module 122 is operable to receive a request from a client device 106 to send a data segment, or a link thereto, as well as other information. The network interface module 122 is also operable to send information from the server 102 to the client devices 106.

The data management module 124 sends data to, and receives data from, the network interface module 122. For example, the data management module 124 receives the request for the data segment and a selection of destinations for the data segment originally sent by a client device 106. The data management module 124 further maintains information about the client device 106, the user of the client device 106, the selected data segment and the multimedia data. In one embodiment, the data management module 124 uses this information to process one request for a data segment at a time. In another embodiment, the data management module 124 manages multiple requests from a single user of a single client device 106. In yet other embodiments, the data management module 124 manages requests for data segments from multiple users of a single client device 106, from multiple users of multiple client devices 106 and from a single user of multiple client devices 106.

The permission determination module 126 communicates with the data management module 124 and determines if permission is granted to share the data segment. The permission determination module 126 obtains metadata about the data segment request. The permission determination module 126 determines if permission is granted based on the metadata. Metadata associated with a data segment may include any information known about the data segment and/or the multimedia data from which it was obtained that can be used to provide access to the data segment. Metadata may also include information about the client device 106 and/or a user associated with the device. For example, metadata may track previous data segment requests.

In an illustrative embodiment, the metadata may include Digital Rights Management information regarding the data segment and the multimedia data. Digital Rights Management or "DRM" refers to the administration of rights in a digital environment. DRM may include any technology used to protect the interests of owners of content and services (such as copyright owners). Typically, authorized recipients or users must acquire a license in order to consume the protected content, e.g., music, movies, books, etc., according to the rights or business rules set by the content owner. The license may include a combination of rights and rules relating to the use of the multimedia data, e.g., the right to play, the right to copy, a time/date window during which the multimedia data may be played, the number of times the multimedia data may be played, etc. Accordingly, the permission determination module 126 may determine if permission is granted to share the data segment based on rights and rules granted by the DRM license. Those skilled in the art will also appreciate that the DRM information associated with the data segment may also prevent further sharing of the data segment by a recipient at the selected destination. For example, in one embodiment, the DRM information associated with the data segment may prevent the recipient from sending the data segment, or a link to such data segment, to another destination. However, in other embodiments, the DRM information may allow the data segment to be shared successively with other recipients.

In other embodiments, the permission determination module 126 determines if permission is granted for sharing the data segment with a selected destination based on metadata that may not include DRM information. In one embodiment, the permission determination module 126 may determine if permission is granted for sharing the data segment based on an amount of data contained in the data segment. In other words, permission may be denied if the user is attempting to share too large a portion of the multimedia data. For example, if the amount of data contained in the data segment is greater than a predetermined threshold amount, then permission for sending the data segment, or a link thereto, to selected destinations is not granted. As yet another example, if an amount of data contained in the data segment divided by the total amount of multimedia data from which the segment was obtained is greater than a predetermined threshold percentage, then permission for sending the data segment, or the link thereto, to selected destinations is not granted.

In another embodiment, the permission determination module 126 determines if permission is granted to send the data segment to the selected destinations based on other data segments previously selected from the multimedia data. In other words, permission may be denied if the user is attempting to recreate the multimedia data by sharing too many or successive segments of the multimedia data. For example, permission may be determined based on an amount of data contained in a currently selected data segment added to the respective amounts of data in the other previously selected data segments. In one instance, if the sum of these amounts is greater than a predetermined threshold amount, then permission for sending the data segment, or the link thereto, to selected destinations is not granted. In another instance, if the sum of these amounts divided by the total amount of multimedia data from which the segments were obtained is greater than a predetermined threshold percentage, then permission for sending the currently selected data segment, or the link thereto, to selected destinations is not granted.

Generally, the server 102 may obtain and maintain various statistical or transactional data about the data segment, the multimedia data, the user of the data segments, the client devices 106, the data segment destinations, etc. For example, the statistical data may include total number of data segments selected from the multimedia data by each user and sent to each destination. Permission to share a next data segment may be determined based on this total number. Other data, such as mean, standard deviation, etc., may also be used in combination with other information to determine permission. Those skilled in the art will appreciate that the permission determination module 126 may determine permission to send the data segment(s), or the links thereto, to the selected destination(s) based on a wide variety of metadata without departing from the spirit and scope of this disclosure. Moreover, the metadata upon which permission to share is based may include DRM information, non-DRM information and/or any combination thereof.

Figure 2A:
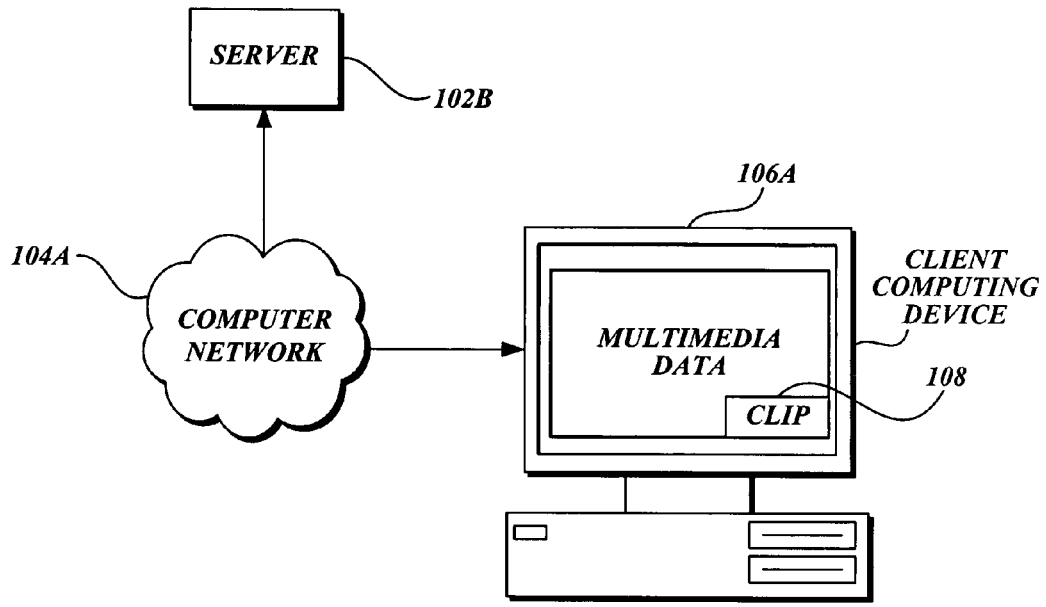
FIG. 2A is a pictorial diagram depicting an embodiment of the operating environment in which a data segment is selected.

FIG. 2A is a pictorial diagram depicting one embodiment of the operating environment in which a data segment is selected for sharing by a user of a client device 106A. In the illustrated embodiment, multimedia data received from the server 102B via the network 104 is presented on the client device 106A using a Web browser. In another embodiment, the multimedia data is presented in a software application running on the client computing device 106A, such as a media player software application. Once presented, the user of the client device 106A may select a data segment from the multimedia data by issuing a segment command via a user interface control, such as "clip" button 108, that is provided, for example, by the browser or media player application. In one embodiment, selecting the "clip" button 108 causes a segment command to be issued, and in turn, causes a predetermined data segment to be selected. For example, issuing a segment command causes the selection of a predetermined number of seconds of multimedia data, such as 30 or 60 seconds, presented immediately prior to the selection of the button 108. Accordingly, the selected data segment may be specified by a start point and a length of the selected data segment relative to the multimedia data from which the data segment was selected. In yet another embodiment, the selected data segment may be specified by a start point and an end point of the selected data segment relative to the multimedia data from which the data segment was selected. In yet other embodiments, the data segment may be selected from a menu or list of available data segments and/or may be generated using a variety of other techniques or algorithms known to those skilled in the art.

Once the data segment is selected, a unique segment ID is assigned to the selected data segment for future reference. The unique segment ID of each selected data segment may be used by the data management module 124 to manage, in collaboration with the permission determination module 126, permissions associated with each of multiple data segments concurrently handled by the data management module 124, as noted above with respect to FIG. 1B. Furthermore, the data management module 124 may use the unique segment ID to uniquely associate optional additional information with the respective selected data segments, as described more fully below with respect to FIG. 3. For example, the data management module 124 may use the unique segment ID for a selected data segment to differentiate the selected data segment from other previously selected data segments during determination of respective permissions.

In one embodiment, the unique segment ID may be created using a mathematical function, such as a hash function, used alone or in combination with other information, such as a time-stamp. A hash function comprises an algorithm that transforms a string of data into a shorter value of fixed length that represents the original string of data. Those skilled in the art will appreciate that other data processing methods may be used to create an identifier for the string of data, such as the selected data segment.

In another embodiment, the unique segment ID is created using a combination of a unique user ID and a time stamp. For example, the unique user ID may be assigned to the user of the client device 106A based on the hardware of the client device 106A, such as a network MAC (Media Access Control) address. Those skilled in the art will recognize that MAC addresses are assigned to hardware network interface modules at manufacturing time and are globally unique. The MAC address is used as a data link layer network address in a hierarchical network system.

Figure 2B:
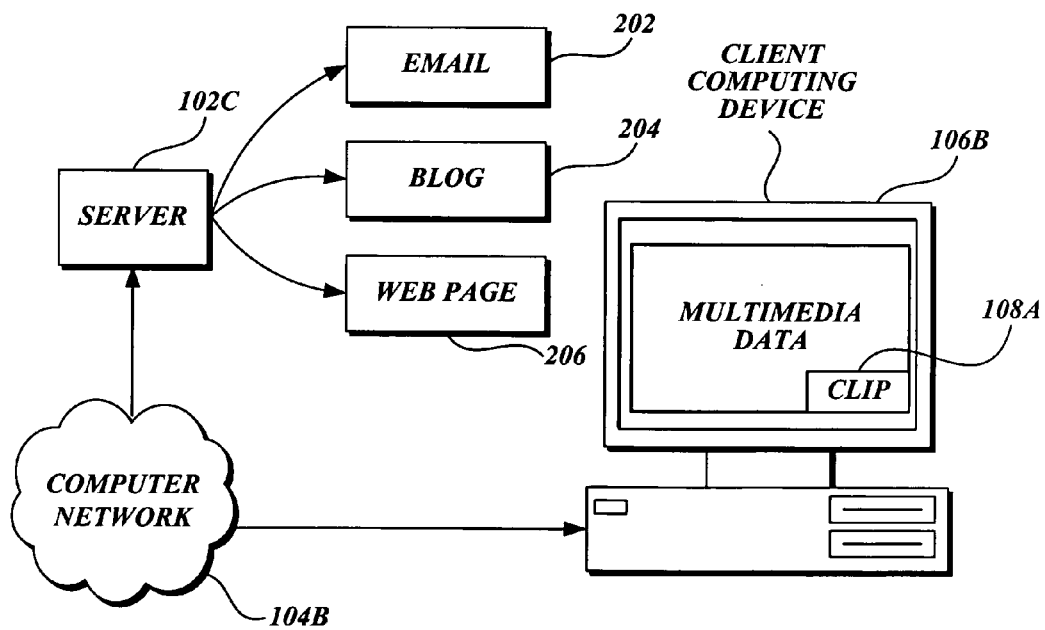
FIG. 2B is a pictorial diagram depicting an embodiment of the operating environment in which a data segment that has been selected is sent to one or more destinations.

FIG. 2B is a pictorial diagram depicting one embodiment of the operating environment in which a selected data segment is shared with others, i.e., the selected data segment or link thereto is sent to one or more destinations. As will be described in more detail below, once a data segment is selected by the user, the client device 106B sends a request to share the data segment to the server 102C via the communication network 104B. The request to the server 102C to share the selected data segment must provide sufficient information (e.g., a unique segment ID) to the server 102C to enable the server 102C to identify the selected data segment.

In one embodiment, one or more data segment destinations are presented by the client device 106B via a user interface for selection by the user. In one embodiment, each data segment destination is assigned a unique destination ID. The unique destination ID may be created using a Uniform Resource Identifier ("URI"), an email address, or other information that can uniquely identify a data segment destination. Such destinations may include, for example, an electronic mail ("e-mail") destination 202, a Web page destination 204, a BLOG destination 206, or any other destination capable of receiving and processing a segment of multimedia data. In one embodiment, the user may provide comments to be associated with the data segment in the email, on the identified Web page, or in the BLOG. In another example, the user may utilize a software application that accesses the selected data segment from a URI for an RSS (Really Simple Syndication) feed. RSS is a technology for easy distribution of content from Web sites. RSS is based on XML (eXtensible Markup Language). Those skilled in the art will appreciate that the server 102C may provide other data segment destinations to the user of the client computing device 106B or the user may input other data segment destinations without departing from the spirit and scope of this disclosure.

Upon receipt of the request to share the data segment with one or more of the selected destinations, the server 102C determines if permission is granted for sending the data segment, or a link thereto, to a selected data segment destination. If so, the server 102C sends the selected data segment, or the link thereto, to the selected destination.

Figure 3:
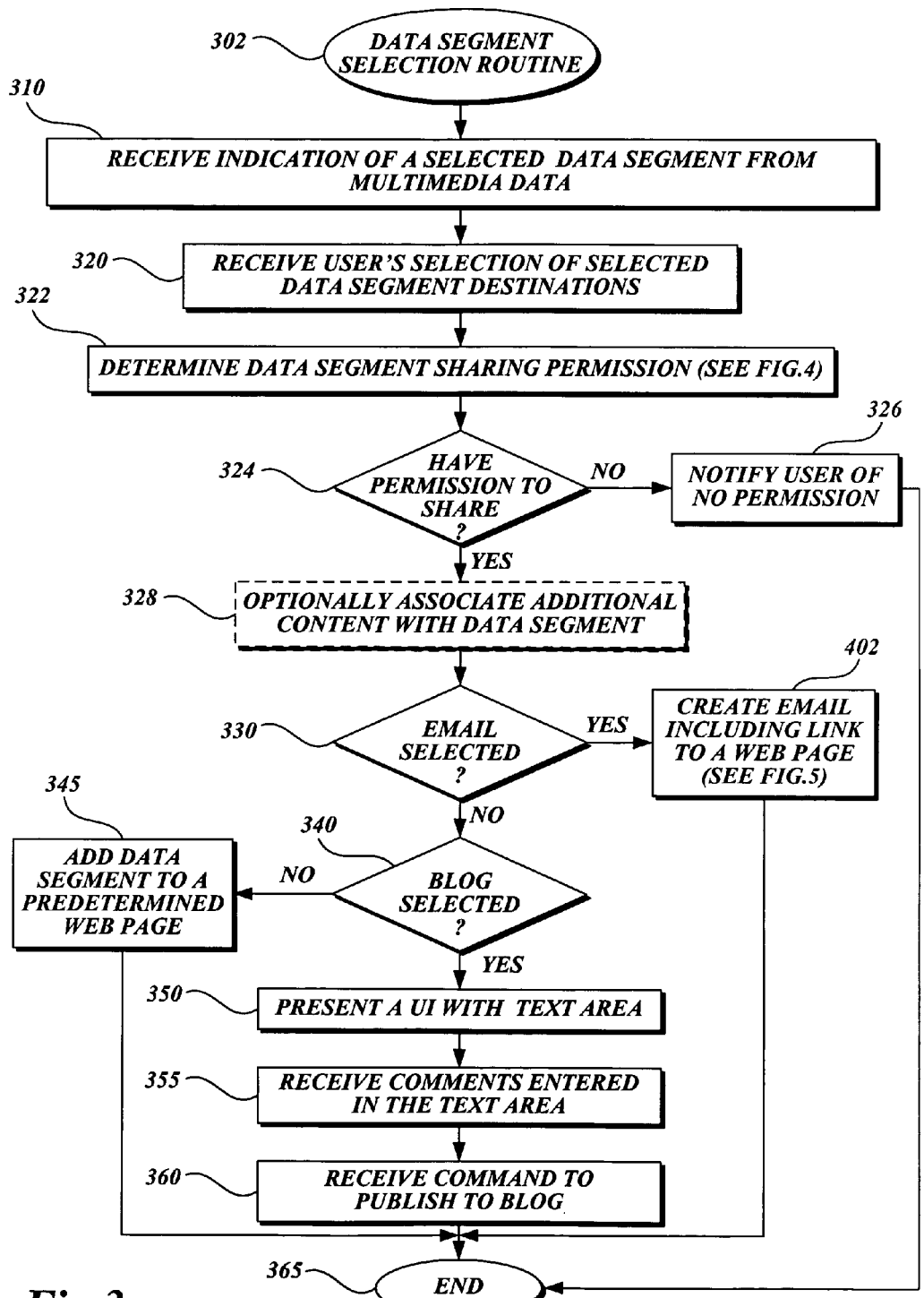
FIG. 3 is a flow diagram depicting a sample method for selecting and sharing a data segment of multimedia data.

FIG. 3 is a flow diagram depicting a sample method for selecting and sharing a data segment of multimedia data. In one embodiment, this sample method is implemented by the permission determination module 126. As discussed above in connection with FIG. 2A, in one embodiment, the user of a client device may select a data segment for which a permission to share is determined. If permission is obtained from the server 102, the data segment may then be sent to one or more selected destinations.

The flow diagram begins in block 302 and proceeds to block 310 where the server 102 receives a request to share data from a client device 106 a selected data segment of multimedia. The request to share the selected data segment is initiated by issuing a segment command, for example, by selecting "clip" button 108 as described above in connection with FIG. 2A. In one embodiment, the permission to share the selected data segment may be predetermined based on metadata associated either with the requested data segment and/or the client device 106. If such predetermined permission denies sharing the data segment, the flow diagram ends without proceeding further. In one embodiment, the flow diagram provides a notice to the user that permission to share the selected data segment is not available. At block 320, the server 102 receives a selection of a data segment destination selected by the user of the client device 106, as discussed above with respect to FIG. 2B. At block 322, the server 102 determines if permission is granted to share the selected data segment with the selected destination. One embodiment of a method for determining permission is described in more detail below in connection with FIG. 4. Next, if it is determined in a decision block 324 that permission to share is not granted, the flow diagram proceeds to block 326 where the user is notified that permission to share the selected data segment has been denied. The user may be notified via any suitable notification means, e.g., via a dialog box, e-mail, SMS message, etc. In other embodiments, the user is presented with options to take further actions, such as to purchase the multimedia data (which may result in obtaining the permission to share segments thereof), apply for a license to copy and distribute the multimedia data, create a shorter or different segment of the multimedia data, etc. Those skilled in the art will appreciate that a variety of options for other actions may be presented to the user to obtain permission for sharing the data segment without departing from the spirit and scope of this disclosure.

Returning to block 324, if permission to share is granted, additional information may optionally be associated with the data segment at phantom block 328. Additional information may include context based information, such as advertising content related to the selected data segment; purchasing information for the multimedia data; date and place of production of the multimedia data; name of contributors to the multimedia data; e.g., actors, directors, producers, etc. Those skilled in the art will appreciate that the additional information may include other types of information related to, or associated with, the data segment without departing from the spirit and scope of this disclosure. In one embodiment, the information is determined based on data collected by tracking user preferences as described in more detail below in connection with FIG. 6. In other embodiments, additional information is supplied by the user via appropriate user interface elements and controls. In yet other embodiments, additional information is automatically associated with the data segment due to a pre-existing association with the multimedia data from which the data segment was obtained. For example, if the multimedia data from which the segment was obtained is a movie, an advertisement for the movie may be associated with any data segment selected from the movie and thus, delivered with the data segment to the selected destination. Although in one embodiment, context based information that is in some way related to the data segment is associated with the data segment and sent to the selected destination, those skilled in the art will recognize that non-context based information, or a combination of non-context based and context based information may be associated with the data segment and sent.

In one embodiment, the server 102 may dynamically track and provide information to users about users, data segments, destinations, etc. Such dynamically provided information may include statistical data, information about users who are simultaneously using and sharing data segments from the multimedia data, and other similar user-community related data. The user or the server 102 may also provide tagging information about the data segment. Tagging information may generally be used for identifying and/or categorizing the contents of the data segment. For example, the user may tag the data segment as "the food fight" data segment, indicating some information about the contents of the data segment from a comedy show. Such tagging information may be used by other users in a user-community to search for desired data segments. Tagging information may also be used as part of the additional information provided with the data segment, described above.

Once it has been determined that permission to share is granted and once additional information (if desired) is associated with the data segment, server 102 determines at a decision block 330 whether the destination for the data segment selected by the user is an e-mail destination 202. For an e-mail destination 202, the server 102 creates an e-mail message at block 402 and includes a URI or "link" to a Web page including the data segment as described in more detail below in connection with FIG. 5. In one embodiment, the server 102 may cause the additional information (if optionally provided) to be added to the Web page including the data segment. In another embodiment, the additional information is contained in the e-mail message including the link.

If it is determined at block 330 that an e-mail destination 202 was not selected, the flow diagram proceeds to decision block 340 where the server 102 determines whether a BLOG destination 204 was selected by the user for the data segment. BLOGs are generally known to be network sites that present a personal journal on a network, e.g., the Internet, for public viewing. If a BLOG destination 204 was selected, the flow diagram proceeds to block 350 where the server 102 causes a user interface to be presented to the user by the client device 106 for entering comments regarding the data segment. In one embodiment, the user interface includes a dialog box with a text area for entering comments. At block 355, the server 102 receives the comments entered by the user of the client device 106 and at block 360, the server 102 receives a command from the user to publish the data segment and associated comments to the BLOG destination 204. If additional information, such as context based advertising information, has been associated with the data segment, such additional information is published to the BLOG as well. The flow diagram then ends in a block 365.

Returning to decision block 340, if the user has not selected a BLOG destination 204, the flow diagram proceeds to block 345 where the data segment is added to a Web page specified by the user of the client device 106. If additional information, such as context based advertising information, has been associated with the data segment, such additional information is included in the Web page as well. Those skilled in the art will recognize that the data segment and additional information may be added to the Web page itself, if such page is maintained by the server 102. However, in other embodiments in which the Web page is constructed dynamically upon activation of its associated URI, the data segment and additional information may be stored separately and subsequently retrieved and added to the Web page as it is constructed. In one embodiment, the Web page 206 (or the instructions for constructing the Web page) is predetermined. For example, the URI or "link" to the Web page may be maintained by the server 102 in a user profile file associated with the user of the client computing device 106. In another embodiment, the Web page 206 is specified at the time of the selection of the data segment destination by the user of the client computing device 106. For example, the user enters a link for a Web page, such as a community Web page. Regardless, once the data segment is added to the specified Web page, the data segment may be accessed by other visitors to the specified Web page. Once the data segment is added to the Web page, the flow diagram ends in block 365.

Although only e-mail, BLOG, and Web page destinations are described above, those skilled in the art will recognize that numerous other destination options may be presented to and/or selected by the user. For example, a user may choose to store a data segment to a file, send a data segment, or a link thereto, as part of an SMS message to a mobile phone, etc. In another example, the output to a Web page may be facilitated through an RSS feed, as described above. In addition, it will be appreciated that the user may choose to send the data segment, or a link thereto, to more than one destination.

Figure 4:
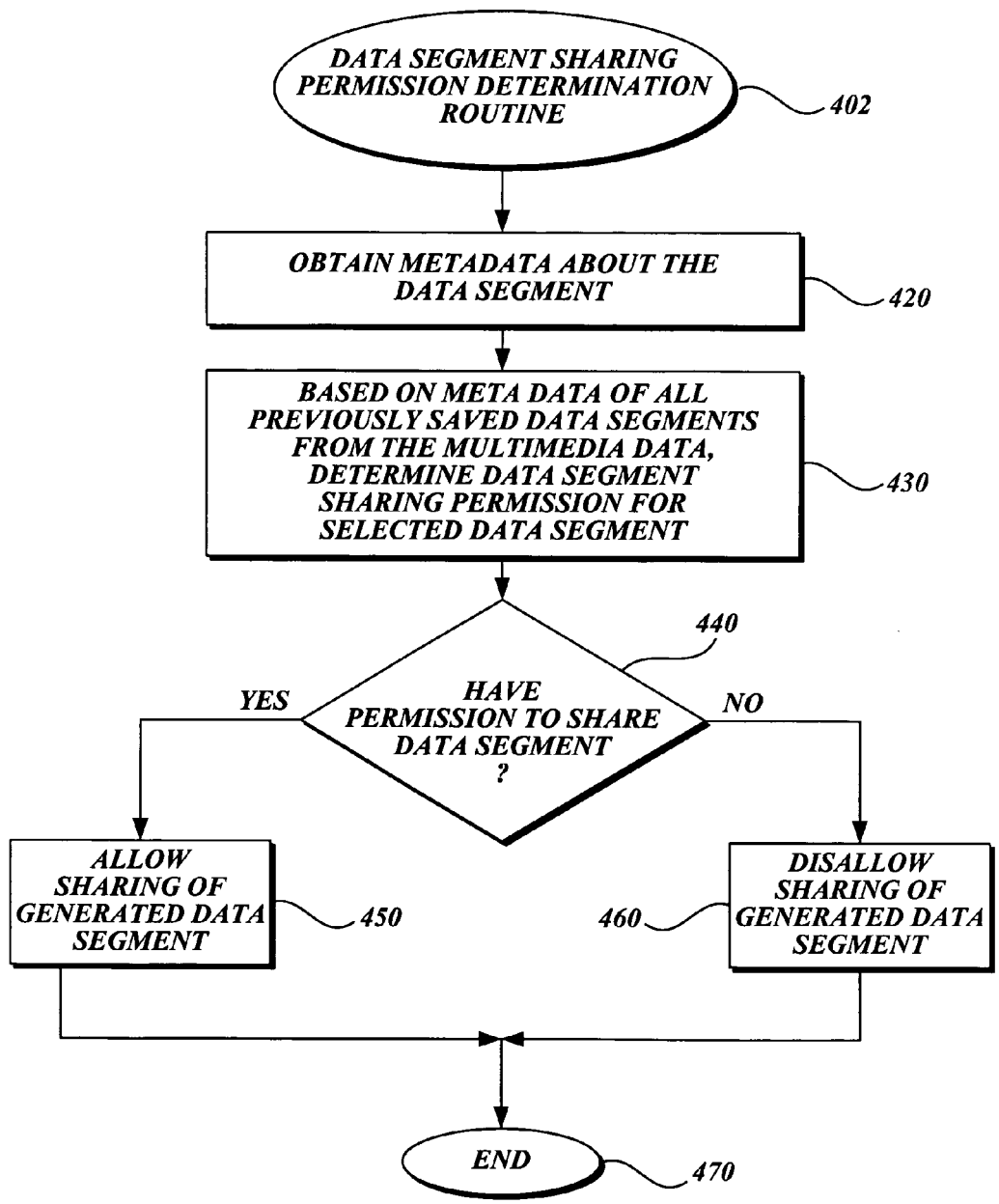
FIG. 4 is a flow diagram depicting a sample method for determining permission to share a data segment.

As noted above, permission to share the data segment is obtained so that it may be sent to other destinations. FIG. 4 is a flow diagram of a sample method for determining if permission to share a data segment has been granted. The flow diagram begins in a block 402 and proceeds to block 410, in which the server 102 obtains metadata about the selected data segment. In one embodiment, the metadata is obtained from a database associated with the server 102. In other embodiments, the metadata is obtained from a source external to the server 102, such as a clearing house production source of the multimedia data, or the client computing device 106. Those skilled in the art will appreciate that the metadata may be obtained from a variety of sources without departing from the spirit of the invention.

Once the metadata is obtained, the server 102 determines at block 430 the permission for sending the selected data segment, or a link thereto, to one or more destinations based on the metadata about the data segment. As noted above, permission may be determined based on DRM information, non-DRM information or a combination thereof. For example, permission may be determined based on the rights in a DRM license associated with the data segment and/or the multimedia data from which the data segment was obtained, Accordingly, if the DRM license includes a right to copy, the data segment may be shared with others. However, if the right to copy is limited by the number of times the user is allowed to play or copy the data segment, permission may be denied. The foregoing are illustrative examples of how permission may be determined based on DRM information, and thus, are not intended to be limiting.

In another embodiment, permission is determined based on non-DRM metadata. For example, permission may be determined based on the amount of data contained in the selected data segment, or an amount of data contained in a currently selected data segment added to the respective amounts of data in the other previously selected data segments. In another example, permission may be based on user-specific information such as the number of data segments that have been downloaded, the number of times the requested data segment has been distributed, subscription account status, and the like. In addition, those skilled in the art will also appreciate that permission may be determined based on a combination of DRM and non-DRM information.

Once the permission (or lack thereof) has been determined in block 430, the flow diagram proceeds to decision block 440 and determines whether permission to send the selected data segment, or a link thereto, to the selected destination is granted. If not, it is noted in block 460 that sharing of the selected data segment with the selected destination is not allowed. Accordingly, the selected data segment or a link thereto is not sent to the selected destination (see FIG. 3). However, if it is determined in decision block 440 that the permission to share the selected data segment is granted, it is noted in block 450 that sharing is allowed and the selected data segment or a link thereto is sent to the data segment destination (see FIG. 3). The flow diagram then ends in a block 470.

Once permission is determined as granted, the data segment may be shared. As noted above, in one embodiment, the data segment may be shared via e-mail. As shown in FIG. 2B, the user of the client device 106B may select one or more e-mail destinations for the data segment via a user interface. Upon selection of the e-mail 202 destination, the server 102C launches an e-mail software application program, and composes an e-mail message including a link to the data segment. The user of the client device 106B supplies information for the e-mail message, such as the e-mail address of a recipient of the e-mail message. In another embodiment, the text of the e-mail may be generated by the server 102.

Figure 5:
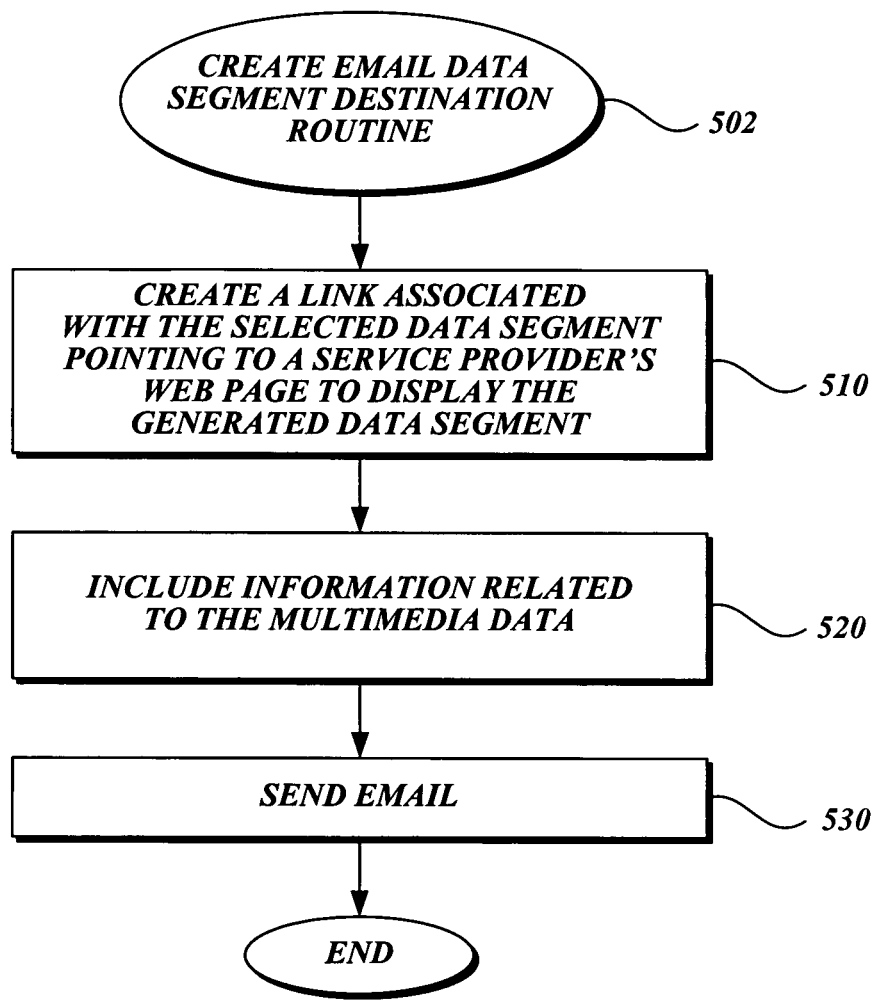
FIG. 5 is a flow diagram depicting a sample method for creating an e-mail used to send a data segment to an e-mail destination.

FIG. 5 is a flow diagram of a sample method for sending a data segment, or a link thereto, to an e-mail destination specified by the user once the user has composed the e-mail message as described above. The flow diagram begins at block 502 and proceeds to block 510 where the server 102 creates an e-mail message including the URI or link that identifies the resource from which the selected data segment may be accessed. In one embodiment, the URI comprises a hyperlink to a Web page which is stored by the server 102 and used by a recipient of the e-mail message to access the selected data segment. Upon selection of the link by the recipient of the e-mail message, the Web page including the data segment is downloaded from the server 102 to the client device 106 of the recipient and the data segment may be presented to the recipient of the e-mail message using a media player application resident on the client device 106. In another embodiment, the URI may identify a file containing the data segment. Accordingly, when the URI is selected by the recipient, the file may be transferred to the client device 106 using the file transfer protocol ("FTP") or any other suitable network protocol for transferring files. Following transfer, the data segment may then be presented to the user using a media player application resident on the client device 106. Alternatively, activation of the URI may cause the data segment to be streamed to the client device 106 of the recipient, again using the media player application resident on the client device 106.

Next, at block 520, if additional information is associated with the data segment, the server 102 may include the additional information in the Web page that is to be delivered to the client device 106 of the recipient when the link is activated. In another embodiment, the additional information may be included in the body of the e-mail message or attached to the e-mail message as a separate file. As noted above, the additional information may include advertising information related to the multimedia data, information about the content of the data segment and/or the multimedia data, information about related services and goods, information regarding the user of the client device 106 who sent the data segment, etc. At block 530, the server 102 causes the e-mail message to be sent to the recipient specified by the user of the client device 106. The flow diagram then ends at block 540.

Figure 6:
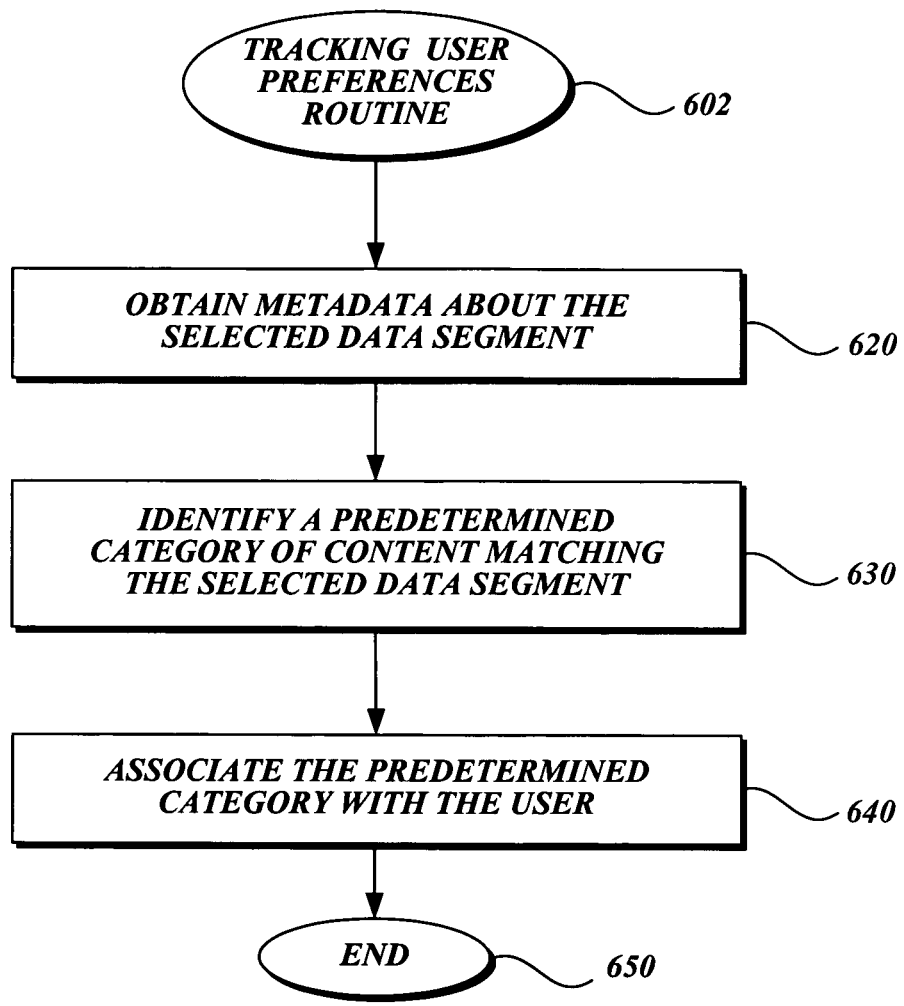
FIG. 6 is a flow diagram depicting a sample method for tracking user preferences to be used in selecting additional content for delivery with a data segment.

As noted above, additional information may be associated with the data segment and presented when the data segment is shared. FIG. 6 is a flow diagram of a sample method for identifying such additional information by using user preferences. More specifically, a particular user's preferences may be tracked and used to identify additional information that may be presented with the data segment. The flow diagram begins at block 602 and proceeds to block 620 where metadata about the selected data segment is obtained. As discussed above with respect to FIG. 4, the metadata may be obtained from a number of different sources including a database accessible to the server 102, an external source like a clearing house, a predetermined blanket policy associated with the provider of the multimedia data, etc. At block 630, a predetermined category of the data contained in the selected data segment is identified based on the metadata associated with the data segment and/or multimedia data from which the data segment was obtained. For example, the predetermined category may include "comedy," "politics," "action," "sports," "shopping," etc. At block 640, the predetermined category is associated with the user of the client device 106. Once associated with the user, the predetermined category may be used to identify and maintain the preferences of the user of the client device 106. More specifically, the method 602 gathers statistics about the categories of the data segments that the user selects. Based on these statistics, the user's preferences may be identified. The preferences of the user may then be used to identify additional information related to the selected data segment. For example, if the gathered statistics indicate that the user selects sports-related multimedia data more than a certain percentage of the time, for example, 55%, then additional sports-related information, e.g., data, services, and/or goods, is identified and associated with the data segment.

Figure 7:
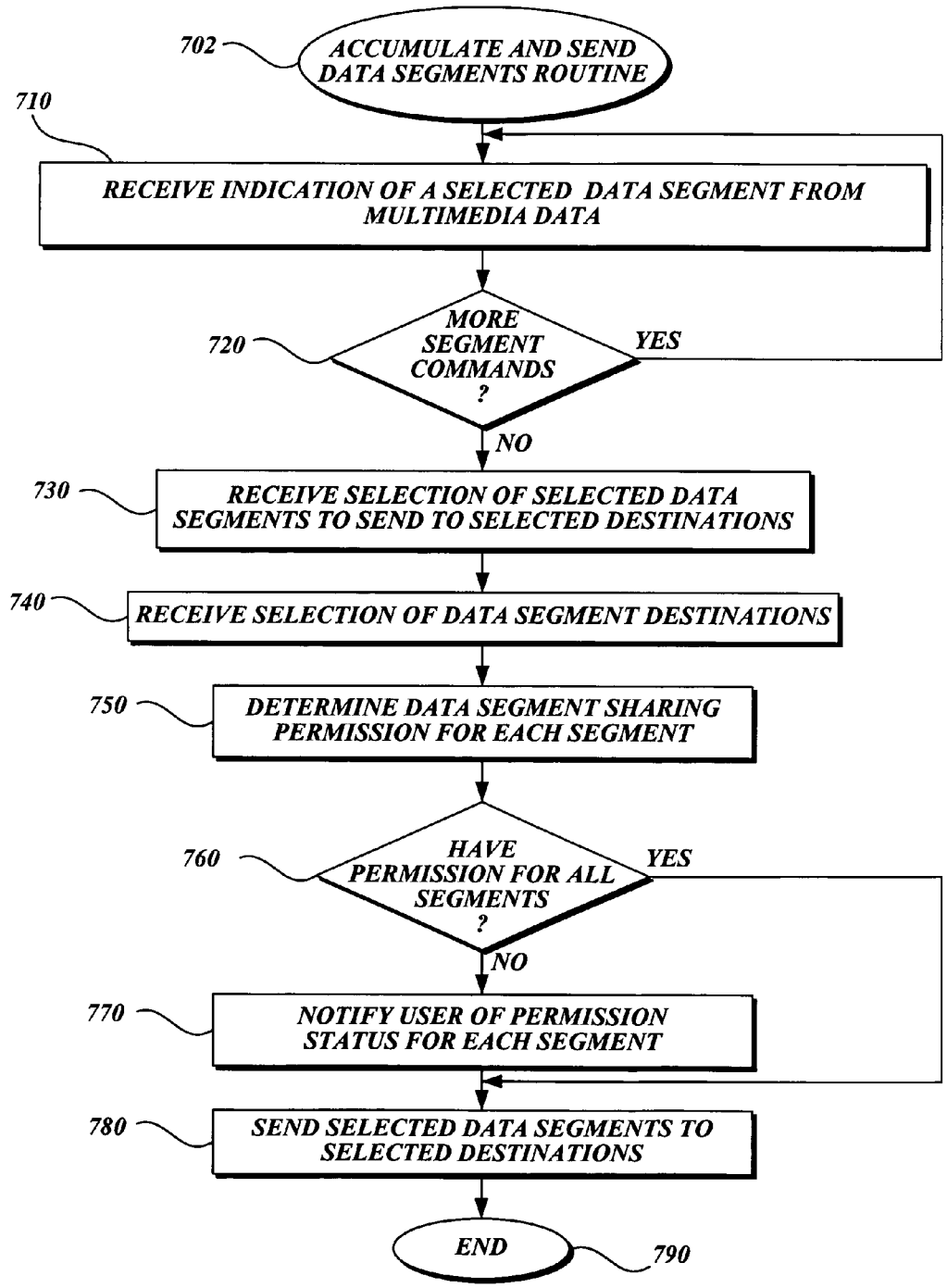
FIG. 7 is a flow diagram depicting a sample method for accumulating and sending multiple data segments.

Although the above description refers to the selection and sharing of one data segment, in other embodiments, multiple data segments may be selected successively and shared by the user. FIG. 7 is a flow diagram of a sample method for first accumulating and sharing multiple data segments. The flow diagram begins at block 702 and proceeds to block 710 where a request to share a selected data segment, e.g., a segment command, is received from a client device 106. At decision block 720, it is determined whether more requests are forthcoming for additional data segments. For example, a user interface control, such as a button, may be provided to allow the user to indicate that the user is ready to share the data segments collected so far and that no more data segments will be selected. If more data segments are expected, as signified by a lack of the user's indication to the contrary, block 710 is repeated until all requests for data segments have been received. Once all data segments have been selected, as indicated by the user, at block 730, the server 102 receives a selection of the selected data segments. At block 740, the server receives a selection of the respective data segment destinations to which each data segment is to be sent. For example, a user interface, such as a dialog box, may be presented to the user whereby the user selects the data segment destination for each selected data segment. At block 750, permission for sharing each selected data segment is determined, for example, as discussed above with respect to FIG. 4. At block 760, the server determines whether all selected data segments have permission for sharing. If all segments have permission, the selected data segments are sent to the selected destinations in block 780. Otherwise, the user is notified, for example, using a dialog box, of the permission status of each selected data segment at block 770 before proceeding to block 780. In block 780, only those data segments for which permission to share has been obtained are shared with the selected data segment destinations. The flow diagram then ends at block 790.

Figure 8:
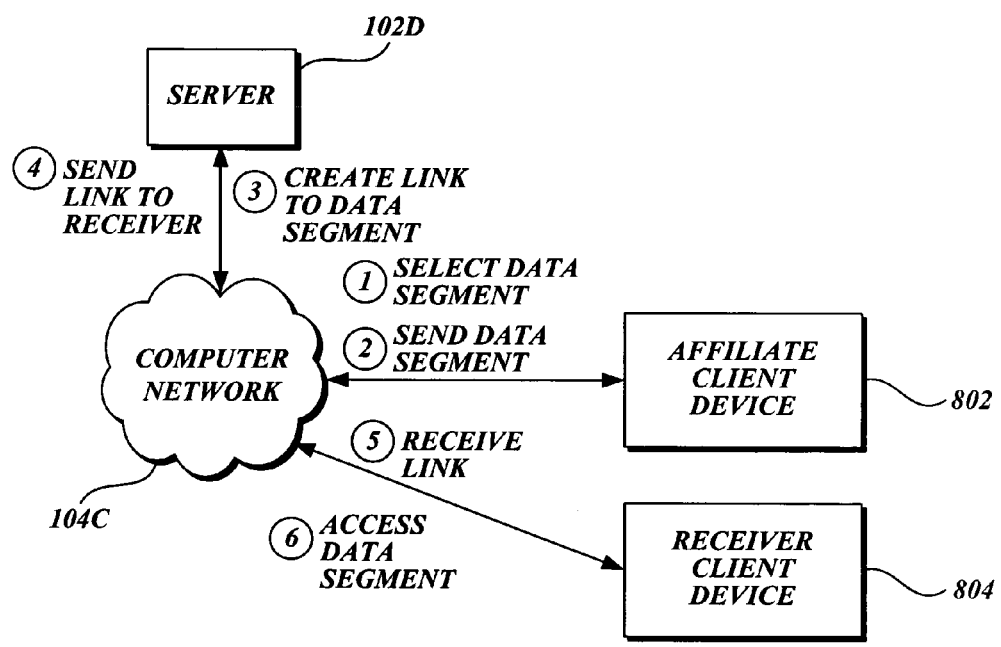
FIG. 8 is a pictorial diagram depicting an embodiment of the operating environment in which a data segment is sent from an affiliate client to a receiver client.

FIG. 8 is a pictorial diagram depicting an embodiment of the operating environment in which a data segment is sent from an affiliate client to a receiver client. In accordance with an affiliate program, an affiliate user may earn certain benefits by sharing certain data segments with others. Otherwise, an affiliate user uses the system and methods described herein as other users of client devices 106. In the illustrated embodiment, the client device 106 is an affiliate client device 802. A user of the affiliate client device 802 selects data segments for sending to users of one or more receiver client devices 804 via the network 104C. More specifically, in one embodiment, a user of affiliate client device 802 selects a data segment and sends information about the data segment to the server 102D via computer network 104C. The server 102D creates a link to the data segment and sends the link to the data segment to the receiver client 804. The receiver client 804 receives the link to the data segment and accesses the data segment via the link.

As will be described below, for each data segment and each receiver client 804, the user of the affiliate client device 802 is associated with the data segment, the association including information about the data segment and the receiver client devices 804. For example, a unique client ID of the affiliate user is associated with the selected data segment in a database by the server 102D. This process is repeated for each data segment that the affiliate user shares with others. Based on the information accumulated in the database in this manner, benefits may be calculated for the affiliate user. In one embodiment, the unique client ID of the affiliate user is assigned by the server 102D during an initial registration process whereby the user registered to become an affiliate user. For example, the user may provide the unique client ID using name, Social Security Number, or a combination thereof. In another embodiment, the unique client ID may be automatically assigned by the server 102D based on the hardware of the affiliate client device 802, such as the network MAC address of the affiliate client device 802. The user of the affiliate client device 802 receives benefits based on the association of affiliate client device 802 with the data segments sent to receiver client devices 804. In one embodiment, the benefits that the user of the affiliate client device 802 receives comprise credit points applicable toward purchase of goods and services offered by third parties associated with the services offered by the server 102D.

Figure 9:
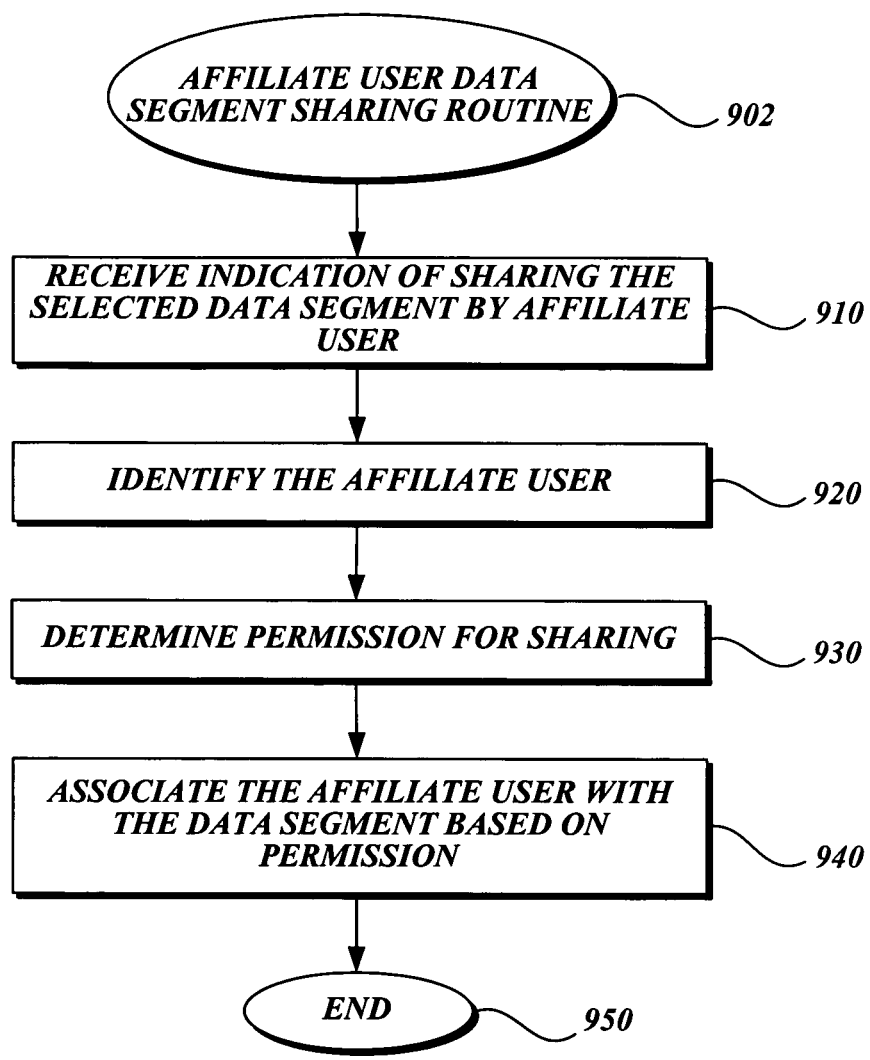
FIG. 9 is a flow diagram depicting a sample method for affiliate user data segment sharing.

FIG. 9 is a flow diagram depicting a sample method for sharing data segments in accordance with an affiliate program. As discussed with respect to FIG. 8, the user of an affiliate client device 802 may gain benefits by sharing certain data segments with others. The benefits accrue to the user of the affiliate client device as described below. The flow diagram begins at a block 902 and proceeds to block 910, where a request to share a selected data segment (e.g., a segment command) is received by the server 102 from an affiliate client device 802. In one embodiment, the request includes a selection of data segment destinations by the user of the affiliate client device 802. At block 920, the server 102 determines the identity of the affiliate user. In one embodiment, the determination of the identity of the affiliate user comprises recording a unique client ID associated with the affiliate user. In another embodiment, the identity of the affiliate user is determined by use of other identifying information associated with the affiliate user, such as name and address. At block 930, the server 102 determines the permission for sharing the selected data segment with selected data segment destinations, as discussed above in connection with FIG. 4. At block 940, the identity of the affiliate user, using, for example, the unique client ID, is associated with the data segment based on the permission determined for the data segment. In one embodiment, the association of the affiliate user with the data segment is used to provide benefits to the affiliate user. For example, the benefits provided for the affiliate user include credit toward the purchase of merchandise and services from third parties. Those skilled in the art will appreciate that the benefits provided for the affiliate user may take many other forms without departing from the spirit of the invention.

While embodiments of the invention have been illustrated and described, it will be appreciated that various changes can be made therein without departing from the spirit and scope of this disclosure.

What is claimed is:

1. A computer-implemented system for sharing data segments of multimedia data, the computer-implemented system comprising:
 a computing device interface configured to receive a request to share a data segment of multimedia data, wherein the amount of data in the data segment is less than a total amount of data in the multimedia data, and wherein the request includes a segment identifier (ID) and a destination ID; and
 a computing device processing unit configured to:
 receive, from the computing device interface, the request to share the data segment;
 determine, based at least in part on metadata associated with the data segment, whether to grant permission to share the data segment corresponding to the segment ID with a destination corresponding to the destination ID, wherein the metadata includes:
 a digital rights management (DRM) policy,
 information about the destination,
 information about a user associated with the destination,
 a sum of the amount of data in the data segment, and
 tracking amounts of data in other data segments that were previously requested from the multimedia data; and
 granting permission to share the data segment with the destination and with successive recipients when:
 the sum is less than a predetermined threshold amount of data in the multimedia data, and
 the sum divided by the total amount of data in the multimedia data is less than a predetermined threshold percentage.

2. The computer-implemented system of claim 1, wherein the computing device processing unit is configured to share the data segment with the destination by sending the data segment and a link to the data segment to the destination.

3. The computer-implemented system of claim 1, wherein the requested data segment is selected by activating a user interface control, and wherein activating the user interface control causes a predetermined amount of data presented immediately prior to activating the user interface control to be selected.

4. The computer-implemented system of claim 1, wherein the request for the data segment further comprises a plurality of destination IDs, and wherein the computing device processing unit is further configured to share the requested data segment with the destination corresponding to each of the plurality of destination IDs according to the determined permission.

5. The computer-implemented system of claim 1, wherein the metadata comprises DRM information.

6. The computer-implemented system of claim 1, wherein the metadata comprises non-DRM information and DRM information.

7. The computer-implemented system of claim 1, wherein the destination corresponding to the destination ID is an electronic mail destination.

8. The computer-implemented system of claim 1, wherein the destination corresponding to the destination ID is a BLOG destination.

9. The computer-implemented system of claim 1, wherein the destination corresponding to the destination ID is a Web page destination.

10. The computer implements system of claim 1, wherein the destination corresponding to the destination ID is an RSS feed.

11. A non-transitory computer-accessible medium having a set of computer-executable modules encoded thereon for managing data segments from multimedia data, wherein the set of modules is stored on a memory and executed on a processor for managing the data segments from the multimedia data, the modules comprising:
    a network interface module for receiving over a computer network a data segment request from a computing device to send at least one of the data segments and a link to the at least one data segment of the multimedia data to a selected destination;
    a data management module for causing the at least one of the data segments and the link to the at least one data segment to be sent to the selected destination when permission to send the data segment and the link is granted; and
    a permission determination module for:
        processing the data segment request received by the network interface module,
        determining whether to grant permission to send the at least one of the data segments and the link to the at least one data segment to the selected destination based at least in part on a digital rights management (DRM) policy included in metadata associated with the at least one of the data segments,
        including:
            information about the selected destination,
            information about a user associated with the selected destination,
            a sum of the amount of data in the at least one data segment requested, and
            respective amounts of data in other data segments that were previously requested from the multimedia data, and
        granting permission to send the data segment and the link to the selected destination in response to determining that
            the sum is less than a predetermined threshold amount of data in the multimedia data, and
            the sum divided by the total amount of data in the multimedia data is less than a predetermined threshold percentage.

12. The non-transitory computer-accessible medium of claim 11, wherein the at least one requested data segment is selected from the multimedia data in response to a segment command issued by a user of the computing device.

13. The non-transitory computer-accessible medium of claim 12, wherein the segment command issued by the user indicates that the data segment comprises a quantity of data corresponding to a predetermined number of seconds of multimedia data presented to the user prior to the issuance of the segment command.

14. The non-transitory computer-accessible medium of claim 11, wherein the multimedia data comprises video data.

15. The non-transitory computer-accessible medium of claim 12, wherein the segment command is issued by the user by activating a user interface control while the multimedia data is being presented.

16. The non-transitory computer-accessible medium of claim 11, wherein additional information is associated with the at least one data segment by the data management module.

17. The non-transitory computer-accessible medium of claim 16, wherein the additional information comprises context based information related to the multimedia data.

18. The non-transitory computer-accessible medium of claim 16, wherein the additional information associated with the at least one data segment is sent to the selected destination via the network interface module.

19. The non-transitory computer-accessible medium of claim 11, wherein the metadata comprises DRM information.

20. The non-transitory computer-accessible medium of claim 11, wherein the metadata includes statistical information about a plurality of users of the multimedia data and a plurality of data segments selected from the multimedia data by the plurality of users.

21. The non-transitory computer-accessible medium of claim 11, wherein the metadata comprises non-DRM information and DRM information.

22. A computing device for managing data segments obtained from multimedia data, the computing device comprising:
    a processing unit; and
    a memory communicatively coupled to the processing unit, the memory storing instructions that in response to execution by the processing unit, cause the computing device to:
    receive a request from another computing device via a computer network to share a data segment, wherein the request includes an indication of the data segment and a selection of selectable destinations to which the data segment is to be sent, and wherein the data segment is selected from the multimedia data in response to a segment command issued by a user of the other computing device;
    obtain metadata, wherein the metadata includes information about the selected destinations, information about a user associated with each destination, a sum of the amount of data in the data segment requested, and respective amounts of data in other data segments that were previously requested from the multimedia data;
    determine whether to grant permission, based at least in part on the information about the selected destinations, the information about the user associated with each destination of the metadata and a digital rights management (DRM) policy included in the metadata;
    send the data segment to the selected destinations when permission to send the data segment is granted, the sum is less than a predetermined threshold amount of data in the multimedia data, and the sum divided by the total amount of data in the multimedia data is less than a predetermined threshold percentage; and
    deny the request when the sum is greater than a predetermined threshold amount of data in the multimedia data or
    the sum divided by the total amount of data in the multimedia data is greater than a predetermined threshold percentage.

23. The computing device of claim 22, wherein the segment command issued by the user generates a data segment comprising a quantity of data corresponding to a predetermined number of seconds of multimedia data presented prior to the issuance of the segment command.

24. The computing device of claim 22, wherein the multimedia data comprises video data.

25. The computing device of claim 22, wherein the segment command is issued by the user of the other computing device by activating a user interface control.

26. The computing device of claim 22, wherein additional information is associated with the data segment.

27. The computing device of claim 26, wherein the instructions further cause the computing device to send the additional information associated with the data segment to the selected destination.

28. The computing device of claim 27, wherein the additional information comprises a tag associated with the data segment.

29. The computing device of claim 28, wherein the tag comprises information usable for automatic searching and finding of the data segment associated with the tag.

30. The computing device of claim 28, wherein the tag comprises information usable to categorize and identify contents of the data segment associated with the tag.

31. The computing device of claim 26, wherein the additional information comprises statistical information about a plurality of users of the multimedia data and a plurality of data segments selected from the multimedia data by the plurality of users.

32. The computing device of claim 22, wherein the data segment is one of a plurality of data segments obtained from the multimedia data, and wherein for each of the plurality of data segments, at least one of the data segment and a link to the data segment is sent to one or more selected destinations in accordance with the determined permission.

33. The computing device of claim 22, wherein the metadata comprises DRM information.

34. The computing device of claim 22, wherein the metadata comprises non-DRM information and DRM information.

35. A computer-implemented method for managing requests to send multimedia data received from an affiliate user of the multimedia data, the computer-implemented method comprising:
receiving, by a computer, an indication of a data segment selected from the multimedia data in response to a data segment request resulting from a segment command issued by the affiliate user;
receiving, by the computer, a selection of a destination to which the data segment is to be sent;
obtaining metadata, wherein the metadata includes information about the selected destination, information about a user associated with the selected destination, a sum of the amount of data in the data segment requested, and respective amounts of data in other data segments that were previously requested from the multimedia data;
sending the data segment to the selected destination when the sum is less than a predetermined threshold amount of data in the multimedia data and when the sum divided by the total amount of data in the multimedia data is less than a predetermined threshold percentage; and
creating, by the computer, an association, based on the permission, between the affiliate user, the data segment, and the selected destination.

36. The computer-implemented method of claim 35, further comprising tracking of activities of the affiliate user based on the association between the affiliate user, the data segment, and the selected destination.

37. The computer-implemented method of claim 36, further comprising providing a benefit to the affiliate user based on the activities of the affiliate user.

38. The computer-implemented method of claim 37, wherein the benefit comprises money.

39. The computer-implemented method of claim 37, wherein the benefit comprises access to content.

40. The computer-implemented method of claim 35, wherein the creating of the association between the affiliate user, the data segment, and the selected destination is based on activities performed at the selected destination in response to receiving the data segment.

41. The computer-implemented method of claim 40, wherein the activities performed at the selected destination comprise purchasing activities related to the multimedia data.

42. A computer-implemented method comprising:
under control of one or more processors configured with instructions that are executable to perform acts comprising:
receiving an indication of the data segment selected from the multimedia data in response to a data segment request resulting from a segment command issued by a user of a computing device;
obtaining metadata, wherein the metadata includes a sum of the amount of data in the data segment and respective amounts of data in other data segments that were previously requested from the multimedia data;
receiving a selection of a destination to which the data segment is to be sent;
determining whether to grant permission, based at least in part on the metadata, to send the data segment to the selected destination; and
sending the data segment to the destination when:
the sum is less than a predetermined threshold amount of data of the multimedia data, and
the sum divided by the total amount of data in the multimedia data is less than a predetermined threshold percentage.

43. The computer-implemented method of claim 42, wherein receiving an indication of the data segment includes receiving a start point and a length of the data segment relative to the multimedia data.

44. The computer-implemented method of claim 42, wherein receiving an indication of the data segment includes receiving a start point and an end point of the data segment relative to the multimedia data.

45. The computer-implemented method of claim 42, wherein obtaining metadata comprises obtaining the metadata from a local data source.

46. The computer-implemented method of claim 42, wherein obtaining metadata comprises obtaining the metadata from an external data source.

47. The computer-implemented method of claim 42, wherein the metadata comprises DRM information.

48. The computer-implemented method of claim 42, wherein the metadata comprises non-DRM information and DRM information.

49. The computer-implemented method of claim 42, wherein sending the data segment comprises sending an electronic mail message having a link to the data segment embedded therein.

50. The computer-implemented method of claim 42, wherein sending the data segment comprises publishing the data segment to a Web log.

51. The computer-implemented method of claim 42, wherein sending the data segment comprises adding the data segment to a Web page.

52. The computer-implemented method of claim 42, wherein sending the data segment comprises adding a link to the data segment to an RSS feed.

53. The computing device of claim 22, wherein the instructions further cause the computing device to send the data segment to the selected destination with a link to the data segment.

54. The computer-implemented method of claim 35, further comprising sending the data segment to the selected destination in response to determining to grant permission.

55. The computer-implemented method of claim 54, wherein sending the data segment to the selected destination includes sending a link to the data segment.

56. The computer-implemented method of claim 42, wherein sending the data segment to the selected destination includes sending a link to the data segment.

* * * * *